United States Patent [19]

Bianchi et al.

[11] 4,000,048
[45] Dec. 28, 1976

[54] NOVEL CATHODE

[75] Inventors: Giuseppe Bianchi; Antonio Nidola, both of Milan, Italy

[73] Assignee: Diamond Shamrock Technologies S.A., Geneva, Switzerland

[22] Filed: Oct. 30, 1975

[21] Appl. No.: 627,275

Related U.S. Application Data

[62] Division of Ser. No. 465,529, April 30, 1974, Pat. No. 3,947,333.

[30] Foreign Application Priority Data

June 25, 1973 Italy ............... 25776/73

[52] U.S. Cl. ............... 204/129; 204/290 F; 204/268
[51] Int. Cl.$^2$ ............... C25B 1/04; C25B 11/04
[58] Field of Search ............... 204/129, 290 F, 293, 204/268; 136/86 DD; 29/198, 199

[56] References Cited

UNITED STATES PATENTS

| | | | |
|---|---|---|---|
| 3,092,517 | 6/1963 | Oswin | 136/86 DD |
| 3,291,714 | 12/1966 | Hall et al. | 204/290 F |
| 3,332,806 | 7/1967 | Teller et al. | 136/86 DD |
| 3,380,908 | 4/1968 | Ono et al. | 204/290 F |
| 3,428,544 | 2/1969 | Bianchi et al. | 204/290 F |
| 3,503,799 | 3/1970 | Aoki et al. | 427/12 |
| 3,616,445 | 10/1971 | Bianchi et al. | 204/290 F |
| 3,632,498 | 1/1972 | Beer | 204/290 F |
| 3,649,485 | 3/1972 | Chisholm | 204/95 |

*Primary Examiner*—F.C. Edmundson
*Attorney, Agent, or Firm*—Hammond & Littell

[57] ABSTRACT

A cathode for electrolysis reactions comprising an electrically conductive electrode base having an outer coating on at least a portion of its exterior of an alloy of palladium and either silver or lead, process for the preparation of said cathodes and a method of electrolysis using said cathode.

5 Claims, No Drawings

NOVEL CATHODE

This is a division of Ser. No. 465,529, filed Apr. 30, 1974, now U.S. Pat. No. 3,947,333.

STATE OF THE ART

Various cathodes have been studied for use in electrolysis reactions and palladium has been used for hydrogen evolution at the cathode in sea water electrolysis but these cathodes hve not been satisfactory because the palladium coating did not have sufficient mechanical stability under the conditions of hydrogen evolution.

The mechanical stability of a palladium coating on a valve metal base such as titanium depends upon the amount of diffusion of hydrogen back through the palladium coating into the valve metal base. The diffusion of adsorbed hydrogen through the coating and the base metal should take place presumably according to the following mechanism:

1. Hydrogen discharge

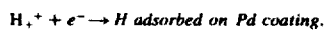

2. Diffusion of adsorbed hydrogen through interphase between Pd coating and titanium base.
3. Diffusion of hydrogen through titanium base.
4. Precipitation of (TiH$_2$) phase.

The diffusion of hydrogen causes blistering and embrittlement of the active coating at the interface between the coating and the valve metal base which causes loss of coating by spawling. The hydrogen also enters the base to form the undesirable valve metal hydride.

The electrocatalytic activity for hydrogen evolution depends upon the concentration of the electronic holes in the palladium and the hydrogen evolution takes place according to the folling equations.

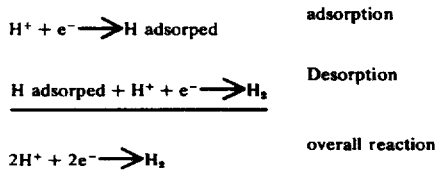

Therefore, in order to expedite hydrogen evolution and reduce hydrogen diffusion through the coating, it is desirable to increase the electrocatalytic activity and to have the adsorption desorption ratio slightly less than 1.

OBJECTS OF THE INVENTION

It is an object of the invention to provide a novel cathode comprising an electrically conductive electrode base having on at least a portion thereof an outer coating of an alloy of palladium and silver or lead.

It is a further object of the invention to provide a novel bipolar electrode comprising an electrically conductive electrode base, a cathodic coating on one side of the base consisting of an alloy of palladium and silver or lead and on the opposite side of the base an anodic coating.

It is an additional object of the invention to provide a novel method for the electrolysis of an electrolyte using an cathode having an alloy of palladium and silver or lead as the cathode coating.

It is another object of the invention to provide a novel method of producing the cathodes and bipolar electrodes.

These and other objects and advantages of the invention will become obvious from the following detailed description.

THE INVENTION

The novel cathodes of the invention are comprised of an electrically conductive electrode base having an outer coating on at least a portion of its exterior of an alloy of palladium and either silver or lead. The percent of silver or lead in the palladium coating may vary up to 50% by weight but 20 to 43% by weight of silver and 10 to 35% by weight of lead are preferred ratios.

The electrode base may be made of any electrically conductive material such as metals and alloys thereof, such as iron, nickel, lead, copper, etc., but is preferably a valve metal such as tungsten, titanium, tantalum, niobium, aluminum, hafnium, vanadium and zirconium or alloys of two or more said metals. The valve metal electrode base may also have an intermediate layer, such as an oxide layer of the valve metal or a coating of another metal such as one of the platinum group metals. The electrocatalytic coating may cover as little s 5% of the electrode base, but preferably covers 50% to 100% of the base.

The cathode of the invention can be used as is or can be used to make a bipolar electrode for use in bipolar electrolytic cells. For example, a valve metal base such as titanium may be coated on one side with the cathode lead-palladium or palladium-silver coating and on the other side coated with an anodic coating such as platinum group metal or platinum group metal oxide or a mixed crystal oxide of a valve metal and a platinum group metal. Anodic coatings of this type are described in British Pat. Nos. 1,147,442 and 1,195,871.

The cathodes of the invention are valuable in electrolytic reaction particularly in an aqueous media. They are useful, for example, for hydrogen evolution in sea water electrolysis as they have a low cathodic potential even over prolonged periods of operation and have excellent mechanical stability, probably due to reduced hydrogen through the coating back diffusion which causes blistering and embrittlement of the coating and valve metal base.

The novel process of the invention for the preparation of the cathodes of the invention comprises applying to an electrically conductive electrode base a solution of a mixture of thermally reducible salts of palladium and a member selected from the group consisting of silver and lead and drying and heating coated electrode base to form a cathode having on at least a portion of its exterior a coating of an alloy of palladium and silver or lead.

The solution of the thermally reducible salts is preferably an aqueous media such as water or water and a watermiscible organic solvent such as ethanol or isopropanol. The thermally reducible salts may be any suitable salts such as halides, nitrites, sulfates or sulfonates, etc., but the chlorides are preferred for economical reasons and because of their solubility in water. The preferred solutions are slightly alkaline.

The coated cathode may be heated in a preliminary step to evaporate the aqueous solvent and then be heated at sufficiently high temperature to form an alloy of the two metals. The thermal decomposition may be effected in air at temperatures low enough not to form the oxides or in an inert atmosphere such as nitrogen or argon. The preferred heating ranges are 250° to 600° C, most preferably 400° to 550° C.

The coating may be applied in a single coat but it has been found that optimum results are obtained when the coating is applied in multiple coats, i.e. 15 to 20 coats with intermediate heating between each coating and a more prolonged final heat treatment after the last coating. After each heating, the electrodes are naturally cooled in air or an inert atmosphere.

In the following examples there are described several preferred embodiments to illustrate the invention. However, it is to be understood that the invention is not intended to be limited to the specific embodiments.

EXAMPLE I

Eight titanium sheet coupons (10mm × 10mm) were etched in refluxing azeotropic hydrochloric acid for 40 minutes and were then washed throughly with distilled water. The etched coupons were then coated on one side with 20 layers of the compositions of Table I with heating between each layer at 300° C for 10 minutes in a forced air over followed by natural cooling. After the final layer, the coupons were heated in the oven at 450° C for 15 minutes followed by natural cooling. The aqueous ammonia solution used in Table I contained 26.3% by weight of ammonia. The amounts of metal are calculated as if free metal.

TABLE I

| Specimen No. | Liquid coatings | | | | | % Ag. in Pd-Ag coating |
|---|---|---|---|---|---|---|
| 1 | $PdCl_2$ | 2.00 | mg | as | Pd | 0 |
|   | $NH_3$ | 0.75 | $cm^3$ | | | |
| 2 | $PdCl_2$ | 1.80 | mgr | as | Pd | 11.1 |
|   | $AgNO_3$ | 0.20 | " | " | Ag | |
|   | $NH_3$ | 0.75 | $cm^3$ | | | |
| 3 | $PdCl_2$ | 1.70 | mg | as | Pd | 17.6 |
|   | $AgNO_3$ | 0.30 | " | " | Ag | |
|   | $NH_3$ | 0.75 | $cm^3$ | | | |
| 4 | $PdCl_2$ | 1.60 | mg | as | Pd | 25 |
|   | $AgNO_3$ | 0.40 | " | " | ag | |
|   | $NH_3$ | 0.75 | $cm^3$ | | | |
| 5 | $PdCl_2$ | 1.50 | mg | as | Pd | 33.3 |
|   | $AgNO_3$ | 0.50 | " | " | Ag | |
|   | $NH_3$ | 0.75 | $cm^3$ | | | |
| 6 | $PdCl_2$ | 1.40 | mg | as | Pd | 42.8 |
|   | $AgNO_3$ | 0.60 | " | " | Ag | |
|   | $NH_3$ | 0.75 | $cm^3$ | | | |
| 7 | $PdCl_2$ | 1.00 | mg | as | Pd | 50 |
|   | $AgNO_3$ | 1.00 | " | " | Ag | |
|   | $NH_3$ | 0.75 | $cm^3$ | | | |
| 8 | $PdCl_2$ | 1.20 | mg | as | Pd | 66.6 |
|   | $AgNO_3$ | 0.80 | " | " | Ag | |
|   | $NH_3$ | 0.75 | $cm^3$ | | | |

The said coated coupons were used in electrolysis of sea water at a current density of 2000 A/m² and the cathode potentials and the amount of coating weight loss was determined after 3,000, 4,000, 5,000, 6,000 and/or 10,000 hours of operation. The results are reported in Table II.

TABLE II

| SPECIMEN NO. | % Ag in Pd-Ag Coating | CATHODE POTENTIAL V(NHE) | | | | | | FINAL COATING WEIGHT LOSS mg/cm |
|---|---|---|---|---|---|---|---|---|
| | | Initial value | After 3000 hr. | 4000 hr. | 5000 hr. | 6000 hr. | 10000 hr. | |
| 1 | 0 | 1.20 | 1.50 | — | — | — | — | 2.1 |
| 2 | 11.1 | 1.20 | 1.38 | 1.45 | 1.50 | — | — | 1.9 |
| 3 | 17.6 | 1.18 | 1.20 | 1.22 | 1.22 | 1.26 | 1.35 | 1.2 |
| 4 | 25 | 1.16 | 1.18 | 1.20 | 1.20 | 1.25 | 1.25 | 1.3 |
| 5 | 33.3 | 1.15 | 1.18 | 1.20 | 1.20 | 1.21 | 1.23 | 0.9 |
| 6 | 42.8 | 1.15 | 1.19 | 1.21 | 1.22 | 1.25 | 1.26 | 1.1 |
| 7 | 50 | 1.26 | 1.30 | 1.35 | 1.50 | — | — | 1.85 |
| 8 | 66.6 | 1.18 | 1.20 | 1.22 | 1.24 | 1.28 | 1.30 | 1.3 |

EXAMPLE II

Eight titanium sheet coupons (10mm × 10mm) were etched in azeotropic 20% HCl at reflux temperatures for 40 minutes. After etching, the titanium samples were coated with a liquid coating consisting of 1.5 mg (as Pd) of $PdCl_2$, 0.5 mg (as Ag) of $AgNo_2$ and 0.75 ml of $NH_3$ as an aqueous solution containing 26.5% by weight of $NH_3$ applied in 20 subsequent layers. After each of the first 19 coats, the samples were heated in forced air at 300° C for 10 minutes followed by natural cooling. After the application of the last coat, the samples were submitted to final heat treatment in a forced air oven at different temperatures for 15–60 minutes as indicated in Table III followed by natural cooling.

TABLE III

| SPECIMEN NO. | FINAL HEAT TREATMENT | |
|---|---|---|
| | Time minutes | Temperature ° C |
| 1 | 15 | 400 |
| 2 | 60 | 400 |
| 3 | 15 | 450 |
| 4 | 60 | 450 |
| 5 | 15 | 500 |
| 6 | 60 | 500 |
| 7 | 15 | 550 |
| 8 | 60 | 550 |

The eight samples were then tested in sea water electrolysis at 2000 A/m². The cathode potentials and the coating weight losses after 3000 to 10,000 hours of operation were obtained and the results are in Table IV.

TABLE IV

| SPECIMEN NO. | CATHODE POTENTIAL V(NHE) | | | | FINAL COATING LOSS mg/cm² |
|---|---|---|---|---|---|
| | Initial value | After 3000 hr. | After 5000 hr. | After 10,000 hr. | |
| 1 | 1.14 | 1.16 | 1.18 | — | 0.4 |
| 2 | 1.14 | 1.16 | 1.18 | — | 0.4 |
| 3 | 1.15 | 1.18 | 1.20 | 1.23 | 0.9 |
| 4 | 1.20 | 1.23 | — | — | 0.10 |
| 5 | 1.20 | 1.23 | 1.23 | 1.29 | 1.3 |
| 6 | 1.21 | 1.23 | 1.25 | 1.33 | 1.3 |
| 7 | 1.22 | 1.31 | 1.33 | 1.38 | 1.6 |
| 8 | 1.22 | 1.36 | 1.40 | 1.50 | 2.2 |

EXAMPLE III

Sixteen titanium sheet coupons (10mm × 10mm) were etched in azeotropic 20% HCl at reflux temperatures for 40 minutes. After etching, the titanium samples were coated with the different liquid coatings of Table V. The aqueous ammonia solution was as in the previous Examples.

TABLE V

| SPECIMEN No. | LIQUID COATING | | | | | % Pb in Pd-Pb COATING |
|---|---|---|---|---|---|---|
| 1&2 | PdCl$_2$ | 1.9 | mg | as | Pd | 5.3 |
|  | PbCl$_2$ | 0.1 | " | " | Pb |  |
|  | NH$_3$ | 0.75 | cm$^3$ |  |  |  |
| 3&4 | PdCl$_2$ | 1.80 | mg | as | Pd | 11.1 |
|  | PbCl$_2$ | 0.2 | " | " | Pb |  |
|  | NH$_3$ | 0.75 | cm$^3$ |  |  |  |
| 5&6 | PdCl$_2$ | 1.7 | mg | as | Pd | 17.6 |
|  | PbCl$_2$ | 0.3 | " | " | Pb |  |
|  | NH$_3$ | 0.75 | cm$^3$ |  |  |  |
| 7&8 | PdCl$_2$ | 1.6 | mg | as | Pd | 25 |
|  | PbCl$_2$ | 0.4 | " | " | Pb |  |
|  | NH$_3$ | 0.75 | cm$^3$ |  |  |  |
| 9&10 | PdCl$_2$ | 1.5 | mg | as | Pd | 33.3 |
|  | PbCl$_2$ | 0.5 | " | " | Pb |  |
|  | NH$_3$ | 0.75 | cm$^3$ |  |  |  |
| 11&12 | PdCl$_2$ | 1.4 | mg | as | PD | 42.8 |
|  | PbCl$_2$ | 0.6 | " | " | Pb |  |
|  | NH$_3$ | 0.75 | cm$^3$ |  |  |  |
| 13&14 | PdCl$_2$ | 1.3 | mg | as | Pd | 54 |
|  | PbCl$_2$ | 0.7 | " | " | Pb |  |
|  | NH$_3$ | 0.75 | cm$^3$ |  |  |  |
| 15&16 | PdCl$_2$ | 1.2 | mg | as | Pd | 66.6 |
|  | PbCl$_2$ | 0.8 | " | " | Pb |  |
|  | NH$_3$ | 0.75 | cm$^3$ |  |  |  |

The liquid coatings were applied in twenty subsequent layers and after each application of the first nineteen coats, the samples were submitted to thermal decomposition in an oven with the atmosphere of Table VI at 300° C for 10 minutes followed by cooling in the same atmosphere.

TABLE VI

| SPECIMEN NO | CONTROLLED ATMOSPHERE UNDER THERMAL SALTS DECOMPOSITION |
|---|---|
| 1,3,5,7,9,11,13,15 | N$_2$ (99.9%) + H$_2$(0.1%) |
| 2,4,6,8,10,12,14,16 | Argon (100%) |

After the application of the last coat, the samples were submitted to final heat treatment at 400° C for 1 hour in the said controlled atmospheres followed by cooling under controlled atmosphere. The sixteen coated samples were then tested in sea water electrolysis at 2000 A/m$^2$. The cathode potentials and the coating weight losses after 3,000 to 6,000 hours were determined and the results are shown in Table VII.

TABLE VII

| SPECIMEN NO. | % Pb in Pd-Pb coating | CATHODE POTENTIAL V(NHE) | | | | FINAL COATING WEIGHT LOSS mg/cm$^2$ |
|---|---|---|---|---|---|---|
|  |  | Initial value | After 3000 hr. | After 5000 hr. | After 6000 hr. |  |
| 1 | 5.3 | 1.05 | 1.06 | — | 1.41 | 1.6 |
| 2 | 5.3 | 1.00 | 1.06 | — | 1.43 | 1.0 |
| 3 | 11.1 | 1.04 | 1.04 | — | 1.15 | 0.5 |
| 4 | 11.1 | 1.01 | 1.01 | — | 1.16 | 0.5 |
| 5 | 17.6 | 1.03 | 1.03 | — | 1.15 | 0.6 |
| 6 | 17.6 | 1.00 | 1.07 | — | 1.15 | 0.6 |
| 7 | 25 | 1.00 | 1.06 | — | 1.22 | 0.7 |
| 8 | 25 | 1.02 | 1.05 | — | 1.26 | 0.5 |
| 9 | 33.3 | 1.06 | 1.09 | — | 1.30 | 0.7 |
| 10 | 33.3 | 1.06 | 1.08 | — | 1.29 | 0.9 |
| 11 | 42.8 | 1.10 | 1.19 | — | 1.50 | 1.8 |
| 12 | 42.8 | 1.10 | 1.22 | — | 1.56 | 2.1 |
| 13 | 54 | 1.12 | 1.20 | — | 1.50 | 1.7 |
| 14 | 54 | 1.12 | 1.20 | — | 1.51 | 2.0 |
| 15 | 66.6 | 1.12 | 1.20 | — | 1.50 | 1.9 |
| 16 | 66.6 | 1.10 | 1.20 | — | 1.50 | 2.2 |

The results of Table VII show that the cathodes containing 11 to 33.3% by weight of lead in the lead-palladium alloy give the optimum low cathode overpotential and that the mechanical properties of the coatings are best in this range as seen from the low coating loss.

Various modifications of the cathodes and process of the invention may be made without departing from the spirit or scope thereof and it is to be understood that the invention is to be limited only as defined in the appended claims.

We claim:

1. A bipolar electrode comprising a valve metal base having on one portion thereof a cathodic coating of an alloy of palladium and a member of the group consisting of silver and lead and on a second portion thereof an anodic coating consisting of a member of the group consisting of a platinum group metal, a platinum group metal oxide and a mixed crystal material of a valve metal oxide and a platinum group metal oxide.

2. The electrode of claim 1 wherein the palladium alloy contains 20 to 43% by weight of silver.

3. The electrode of claim 1 wherein the palladium alloy contains 10 to 35% by weight of lead.

4. The electrode of claim 1 wherein the valve metal base is titanium.

5. A method of electrolysis of a sea water electrolyte comprising passing an electrolysis current from an outside source through an electrolysis cell containing the electrolyte and having an anode, at least one bipolar electrode of claim 1 and a cathode.

* * * * *